(12) United States Patent
Arneson

(10) Patent No.: US 9,423,995 B2
(45) Date of Patent: Aug. 23, 2016

(54) METHOD AND APPARATUS FOR RE-SIZING AN ACTIVE AREA OF A FLEXIBLE DISPLAY

(75) Inventor: Theodore R. Arneson, Ivanhoe, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1993 days.

(21) Appl. No.: 11/752,828

(22) Filed: May 23, 2007

(65) Prior Publication Data

US 2008/0291225 A1 Nov. 27, 2008

(51) Int. Cl.
| G09G 5/36 | (2006.01) |
| G06F 3/01 | (2006.01) |
| G06F 3/147 | (2006.01) |
| G06F 3/041 | (2006.01) |
| G09G 5/26 | (2006.01) |

(52) U.S. Cl.
CPC ............ *G06F 3/147* (2013.01); *G06F 3/011* (2013.01); *G06F 3/0416* (2013.01); *G09G 5/26* (2013.01); *G09G 2340/0407* (2013.01); *G09G 2340/0492* (2013.01); *G09G 2340/14* (2013.01); *G09G 2380/02* (2013.01)

(58) Field of Classification Search
None
See application file for complete search history.

(56) References Cited

U.S. PATENT DOCUMENTS

| 5,931,764 | A | 8/1999 | Freeman et al. |
| 5,956,020 | A | 9/1999 | D'Amico et al. |
| 6,243,075 | B1* | 6/2001 | Fishkin et al. ............... 345/156 |
| 7,479,949 | B2 | 1/2009 | Jobs et al. |
| 2003/0160735 | A1* | 8/2003 | Lee et al. ........................... 345/4 |
| 2004/0041800 | A1* | 3/2004 | Daniels ......................... 345/204 |
| 2004/0156270 | A1* | 8/2004 | Weng ............................... 368/82 |
| 2005/0140646 | A1* | 6/2005 | Nozawa ........................ 345/156 |
| 2006/0033724 | A1 | 2/2006 | Chaudhri et al. |
| 2006/0038745 | A1 | 2/2006 | Naksen et al. |
| 2006/0209218 | A1 | 9/2006 | Lee et al. |
| 2007/0097014 | A1 | 5/2007 | Solomon et al. |
| 2010/0045705 | A1 | 2/2010 | Vertegaal et al. |
| 2011/0074700 | A1 | 3/2011 | Sharp |
| 2012/0032979 | A1 | 2/2012 | Blow et al. |

FOREIGN PATENT DOCUMENTS

| JP | 200518492 | 1/2005 |
| WO | 2000079766 A1 | 12/2000 |
| WO | 2012040363 A1 | 3/2012 |

OTHER PUBLICATIONS

U.S. Appl. No. 10/639,805, filed Aug. 2004, Weng, Yuan Sung.*

(Continued)

*Primary Examiner* — Amr Awad
*Assistant Examiner* — Andre Matthews
(74) *Attorney, Agent, or Firm* — Wolfe-SBMC

(57) ABSTRACT

A method (400) for resizing an active area of a flexible display or reconfigurable device (100) can include a screen (104 or 210) and a controller (202) coupled to the screen. The controller can initiate (402) a re-sizing program upon detection of an altered shape for the display or device and control (411) the active area of the display based upon the altered shape. The controller can further resize (414) fonts or graphic elements or both in correspondence to the dimensions of the active area. The controller can initiate the resizing program by altering the flexible display away from a flat position to a non-flat position for example. The flexible display can further include a switch (106) that detects the mating of a first end (111) of the flexible display with a second end (112) which initiates the resizing program.

20 Claims, 3 Drawing Sheets

(56) References Cited

OTHER PUBLICATIONS

Peter Rojas, "Another Round of Nintendo Touch Screen Controller Rumors", Mar. 20, 2005, 9 pages article, http://www.engadget.com/2005/03/20/another-round-of-nintendo-touch-screen-controller-rumors/. Web site last visited May 23, 2007.

NEO, "Apple Patent: Virtual Input Device Placement on a Touch Screen User Interface", Feb. 16, 2006, 9 pages article, http://www.macsimumnews.com/index.php/archive/apple_patent_virtual_input_device_placement_on_a_touch_screen_user_interfac. Web site last visited May 23, 2007.

Segger, "Embedded Software Solutions—emWin", 2 pages article, http://www.segger.com/index.html. Web site last visited May 23, 2007.

Patent Cooperation Treaty, "Notification of Transmittal of the International Search Report and the Written Opinion of the International Searching Authority, or the Declaration" for International Application No. PCT/US2008/062619, Sep. 29, 2008, pp. 1-10.

William P. Alberth, Jr. et al., "Systems and Methods for Managing the Display of Content on an Electronic Device" U.S. Appl. No. 13/455,930, filed Apr. 25, 2012, 48 pages.

Edwin Kee, "Bendable Batteries in the Pipeline?", Ubergizmo, http://www.ubergizmo.com/2011/02/bendable-batteries-in-the-pipeline/, Feb. 28, 2011, 2 pages.

Patent Cooperation Treaty, "PCT Search Report and Written Opinion of the International Searching Authority" for International Application No. PCT/US2013/032886, Jun. 12, 2013, 13 pages.

\* cited by examiner

100

100

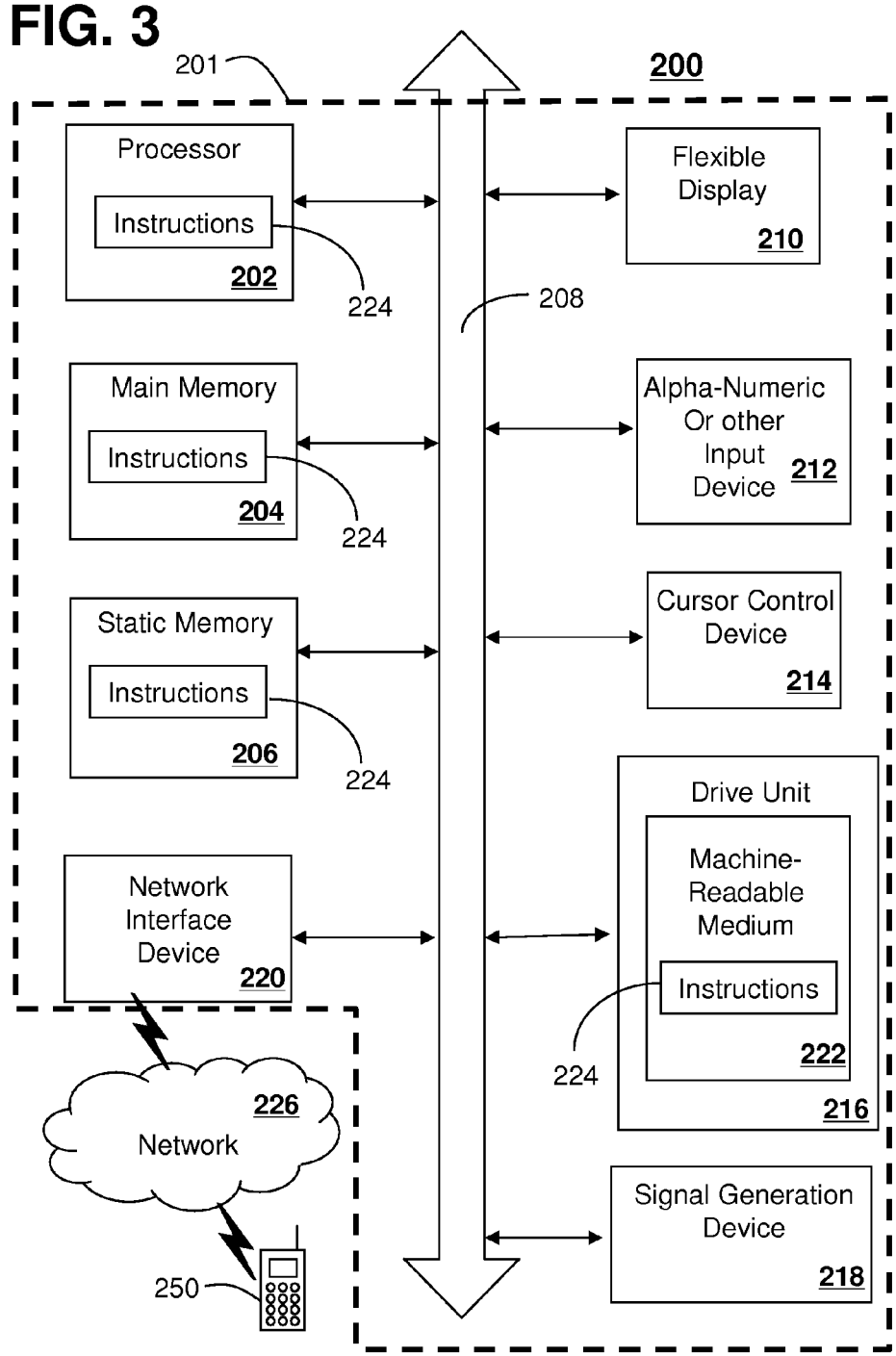

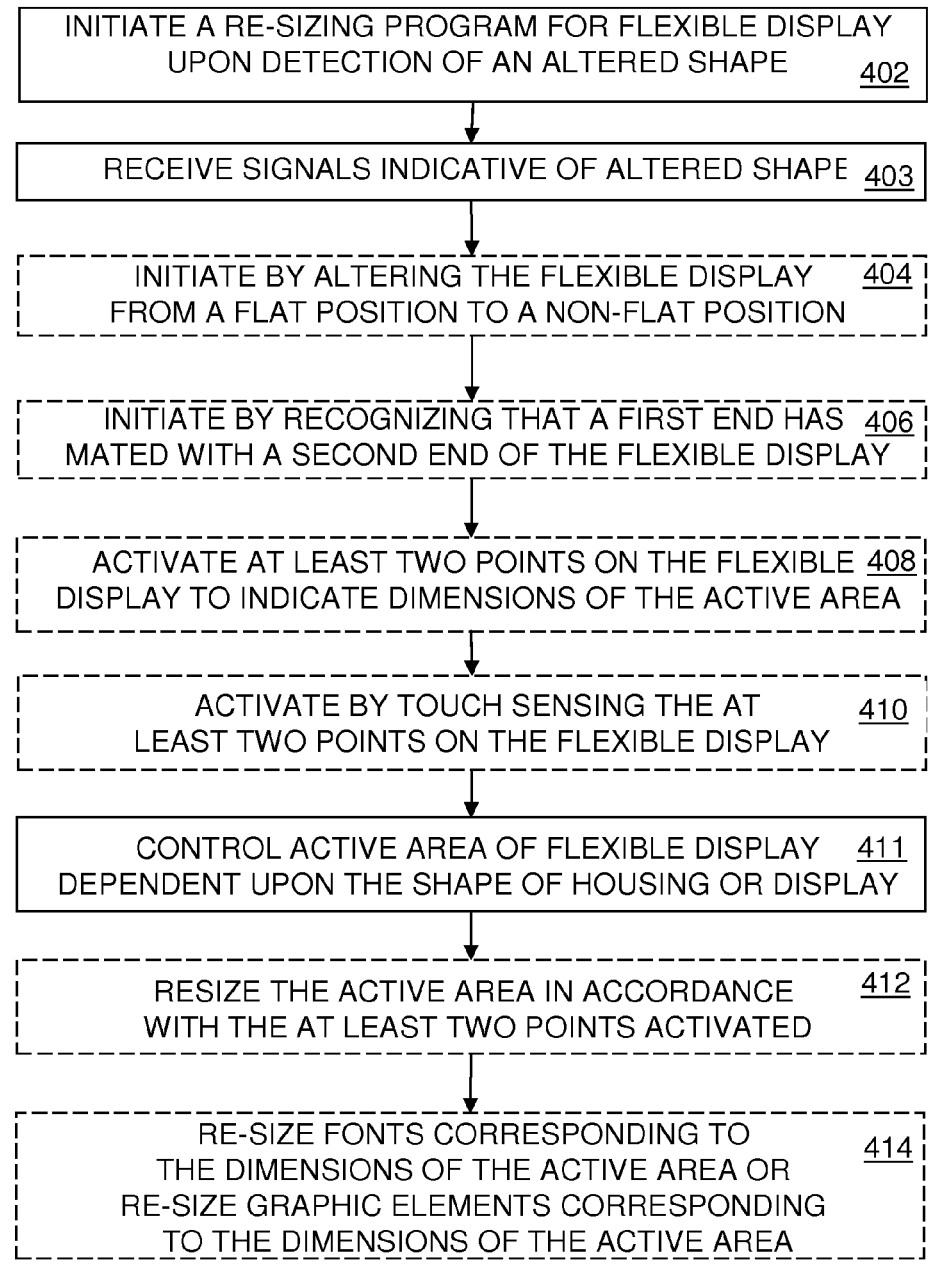

METHOD AND APPARATUS FOR RE-SIZING AN ACTIVE AREA OF A FLEXIBLE DISPLAY

FIELD

This invention relates generally to flexible displays, and more particularly to touch sensitive flexible displays.

BACKGROUND

Flexible displays of various constructs are becoming more viable for commercial applications. In some instances, wearable devices are including flexible displays, yet resizing of such displays are not discussed or contemplated. In other instances, non-flexible touch-screens allow for altering an active area for touch sensitivity as opposed to an active area for visual display of content on such screens. As flexible displays become more accommodating to other body worn applications, certain limitations may become more apparent. For example, where a flexible display is wrapped or flexed, as in the case of a large-screen, wrist-wearable device, the entire display may not be visible to the user and yet no easy means of limiting a display area is currently available.

SUMMARY

Embodiments in accordance with the present invention can provide a method and device that enables users to resize or adjust an active area on a flexible display. The flexible display can be a touch screen that can enable a user to set the active area for display.

In a first embodiment of the present invention, a reconfigurable device can include a reconfigurable housing and a flexible display, the shape of the display flexibly alterable to accommodate different shapes of the housing. The reconfigurable device can further include a processor that is operable to receive signals indicative of the shape of the flexible display and to control the active area of display dependent upon the shape of the housing. The processor can also re-size the active area of the flexible display dependent on the shape of the display or the housing. The device can also include a sensor generating a signal indicative of the curvature of the display. The processor can also be operable to control the active area of the display such that the active area of the display is proportional to the curvature of the display. The housing can be configurable to a plurality of predetermined orientations and the processor is operable to control the active area of the display to be a predetermined area associated with each configuration. The device can further include a memory for storing respective active areas associated with each configuration and at least one sensor for detecting the housing configuration.

The flexible display can have a flat configuration enabling the processor to control the entire display to be active in the flat configuration. The display can have at least one curved configuration and the processor controls the active area to be less than half of the full display area when the display is in the at least one curved configuration. The device can further include a display driver coupled to the processor where the processor controls the driver to alter the active area of the display. The flexible display can be a touch sensitive screen coupled to the processor where the processor is programmed to initiate a re-sizing program for re-sizing an active area of the flexible display and to re-size the active area of the display when activating at least two points on the flexible display to indicate dimensions of the active area for display. The processor can be further programmed to resize fonts corresponding to the dimensions of the active area or to resize graphic elements corresponding to the dimensions of the active area. The processor can initiate the resizing program by altering the flexible display away from a flat position. The flexible display can further include a switch that detects the mating of a first end of the flexible display with a second end of the flexible display which initiates the resizing program. The reconfigurable device can selectively be a wrist-worn device or a hand-held device.

In a second embodiment of the present invention, an electronic product having a flexible display can include a flexible touch sensitive screen and a controller (or processor) coupled to the flexible touch sensitive screen. The controller (or processor) can be programmed to initiate a re-sizing program for re-sizing an active area of the flexible display and re-size the active area of the display when activating at least two points on the flexible display to indicate dimensions of the active area. The controller can further be programmed to resize fonts or graphic elements or both corresponding to the dimensions of the active area. The controller can initiate the resizing program by altering the flexible display from a flat position to a non-flat position. The flexible display can further include a switch that detects the mating of a first end of the flexible display with a second end of the flexible display which initiates the resizing program. The flexible display can be a touch sensitive screen where the controller resizes the flexible display by sensing the activation of at least two points on the flexible display. The flexible display can selectively be a wrist-worn device or a hand-held device selected among a cellular phone, a personal digital assistant, a smart phone, an MP3 Player, a music player, a remote controller, a wrist-worn computer, and a watch.

In a third embodiment of the present invention, a method of re-sizing an active area of a flexible display within a reconfigurable housing can include the steps of initiating a re-sizing program upon detection of an altered shape for the flexible display or the reconfigurable housing, receiving signals indicative of the altered shape of the flexible display or reconfigurable housing, and controlling an active area of the flexible display dependent upon the shape of the housing or the display. The method can further include the step of activating at least two points on the flexible display to indicate dimensions of the active area for display. The step of activating at least two points can include the step of touch sensing the at least two points on the flexible display. The method can further include the step of re-sizing fonts corresponding to the dimensions of the active area and the step of re-sizing graphic elements corresponding to the dimensions of the active area. The step of initiating the resizing program can be done by recognizing that a first end has mated with a second end of the flexible display.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. A "flexible display" can be a flexible screen and flexible frame or a flexible screen alone and is not limited to any particular technology as long as it is flexible. Such technologies can include reflective "e-paper" and emissive organic light-emitting diode (OLED) technologies. E-paper displays are called "bistable" because they can maintain an image when the power is turned off. Reflective displays don't require a backlight, as LCDs do, and can be read outdoors. OLEDs emit their own light and use more power than today's active-matrix LCDs but offer faster performance and richer colors. The term "active area" as used herein refers to the active area that can be viewable on the display and is distinguishable from the active area that is sensitive to touch on a touch screen. "Re-sizing the active area" means changing the size or viewing area that is viewable on the display. "Altering" the flexible display from a flat position is meant to indicate modifying the shape of the display by curling, twisting, bending or by other means into a shape that is not flat. "Recognizing that a first end (of the display) has mated with a second end" can mean that the first end can recognize that it is either connected to or within a predetermined distance (via capacitive coupling or otherwise) from a second end of the flexible display. The phrase "Touch sensing" indicates that a display is sensitive to touch by finger, stylus, capacitive coupling or by other means. The term "reconfigurable housing" can mean a housing that can be altered or configured into various positions or shapes and can include housings that flip, twist, fold or generally transform from one shape to another.

The terms "program," "software application," "resizing program" and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 3 is a block diagram of an electronic device in accordance with an embodiment of the present invention.

FIG. 4 is flow chart illustrating a method of resizing an active area of a flexible display in accordance with an embodiment of the present invention.

DETAILED DESCRIPTION OF THE DRAWINGS

Figure 1:
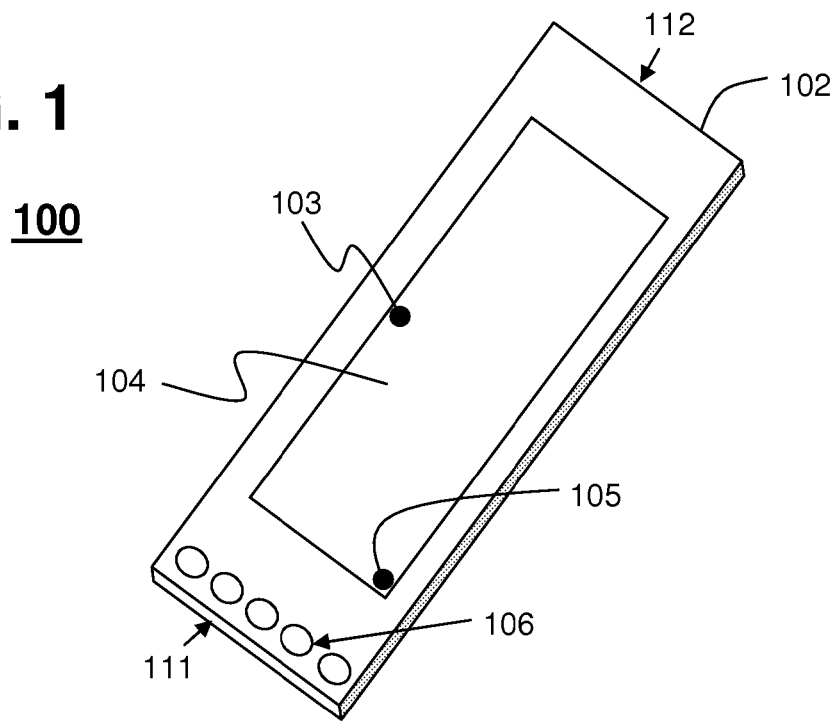
FIG. 1 is a perspective view of a flexible display in a flat position in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of ways using a variety of technologies that enable not only the manufacture of flexible displays, but the means of activating an active area for display on the flexible display. For example, OLEDs and e-paper are just some of the technologies that can be used to make flexible display and touch sensing, switch sensing, and even voice recognition can be used to trigger an alteration of the active area for display on the flexible display.

Referring to FIG. 1, an electronic product such as a reconfigurable device having a flexible display 100 or just a flexible display 100 is illustrated in a flat position that can include a screen such as a touch sensitive screen 104 and optionally surrounded by a reconfigurable housing or frame 102 that can also be flexible. The shape of the display can be flexibly alterable to accommodate different shapes of the housing 102. The flexible display 100 can also include a processor or controller coupled to the touch sensitive screen 104 and can be operable to receive signals indicative of the shape of the flexible display and to control an active area of the display dependent upon the shape of the housing. The processor can also re-size the active area of the flexible display dependent on the shape of the display or the housing. The device can also include a sensor generating a signal indicative of the curvature of the display. Curvature detection can be performed in any number of ways including the use of strain gauges. Detection of curvature can also be determined via wire or wireless connection to another device where the resultant curvature of the display is defined by being attached to another other known device or accessory. The processor can also be operable to control the active area of the display such that the active area of the display is proportional to the curvature of the display. The housing can be configurable to a plurality of predetermined orientations (e.g., curved, flat, folded, or any other 3 dimensional shape) and the processor is operable to control the active area of the display to be a predetermined area associated with each configuration. The device can further include a memory (see items 222, 204, or 206 in FIG. 3) for storing respective active areas associated with each configuration and at least one sensor for detecting the housing configuration.

Figure 2:
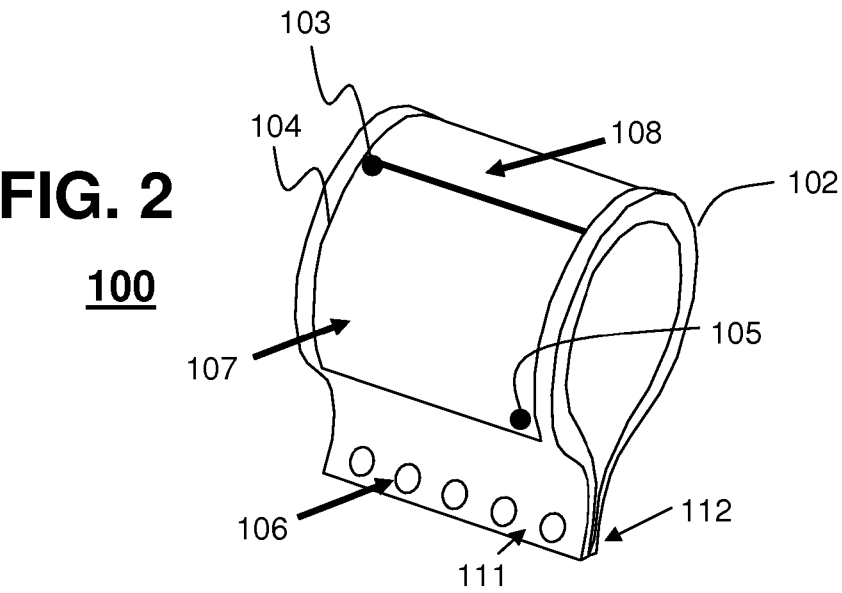
FIG. 2 is an illustration of the flexible display of FIG. 1 in a non-flat position in accordance with an embodiment of the present invention.

The controller (or processor) can optionally be programmed to initiate a re-sizing program for re-sizing an active area of the flexible display and re-size the active area of the display when activating at least two points (103 and 105) on the flexible display to indicate dimensions of the active area for display. The controller can be further programmed to resize fonts or resize graphic elements or both in correspondence to the dimensions of the active area. As a default, the entire screen 104 can be made visible in the flat position. The controller can initiate the resizing program by altering the flexible display from a flat position as shown in FIG. 1 to a non-flat position as shown in FIG. 2. The flexible display can further include a switch 106 (such as a Hall Effect switch) that detects the mating of a first end 111 of the flexible display with a second end 112 of the flexible display which initiates the resizing program. The controller can also resize the active area of the flexible display by sensing the activation of at least two points 103 and 105 on the flexible display. The sensing can be done by a touch sensitive display sensitive to touch or to a stylus. As shown in FIG. 2, the points 103 and 105 can delineate an active area 107 from an inactive display area 108. Of course, the delineation can be changed based on the selection of the two points. The flexible display can be selectively a wrist-worn device or a hand-held device. Of course, the active area can also be adjusted selectively using commands that can be entered by pressing a keypad, voice command or by other means within contemplation of the embodiment herein. If desired, the active area can be adjusted by the physical selection of just a single point where the software intelligently selects the second point to enable the delineation of an active display area from an inactive display area. Although the claim language herein recites the activation of at least two points, such claim language contemplates the physical activation of a single point and alternative selections of other points using software or other means to alter or resize the active area for display.

In another embodiment of the present invention as illustrated in the diagrammatic representation of FIG. 3, an electronic product such as a machine having a flexible display 210 can include a processor or controller 202 coupled to the flexible display. The flexible display can selectively be a wrist-worn device or a hand-held device selected among a cellular phone, a personal digital assistant, a smart phone, an MP3 Player, a music player, a remote controller, a wrist-worn computer, and a watch. Generally, in various embodiments it can be thought of as a machine in the form of a computer system 200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such the flexible display 210. The computer system 200 may include an input device 212 (e.g., a keyboard, microphone, etc.), a cursor control device 214 (e.g., a mouse), a disk drive unit 216, a signal generation device 218 (e.g., a speaker or remote control that can also serve as a presentation device) and a network interface device 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor or controller 202 during execution thereof by the computer system 200. The main memory 204 and the processor or controller 202 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Referring to FIG. 4, a method 400 of re-sizing an active area of a flexible display can include the step 402 of initiating a re-sizing program on a device using the flexible display upon detection of an altered shape of the device or display. At step 403, signals can be generated or received indicative of the altered shape of the device or display. The resizing program can optionally be initiated at step 404 by altering the flexible display away from a flat position (to a non-flat position or a curved position for example) or at step 406 by recognizing that a first end has mated with a second end of the flexible display. The method 400 can further include the step 408 of activating at least two points on the flexible display to indicate dimensions of the active area. Activating the active areas for display can be done in a number of ways. In one embodiment, the active area can be activated at step 410 by touch sensing the at least two points on the flexible display. Other ways can include providing inputs on a keypad or by voice command. In any event, the method 400 can further control the active area of the flexible display dependent upon the shape or the housing or display at step 411. The method can optionally resize the active area in accordance with the at least two points activated at step 412. Optionally, at step 414, the method 400 can re-size fonts corresponding to the dimensions of the active area or re-size graphic elements corresponding to the dimensions of the active area In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A reconfigurable device, comprising:
    a reconfigurable housing, capable of being configured into at least a first shape and a second shape;
    a flexible display, coupled to the reconfigurable housing, wherein the flexible display is delineated into an active area that visually displays content and an inactive area with no visual display of content, further wherein when the reconfigurable housing alters from the first shape to the second shape, the flexible display remains fully exposed while a shape of the flexible display alters;
    a sensor, for generating a signal indicative of the shape of the flexible display; and
    a processor, coupled to the sensor, for changing the delineation of the active area from the inactive area dependent upon the shape of the flexible display.

2. The reconfigurable device according to claim 1, wherein the signal indicates a curvature of the flexible display.

3. The reconfigurable device according to claim 2, wherein the processor is operable to control the active area of the flexible display such that the active area of the flexible display is proportional to the curvature of the flexible display.

4. The reconfigurable device according to claim 1, wherein the processor is operable to control the active area of the flexible display to be a first predetermined area when the reconfigurable housing is in the first shape and to be a second predetermined area when the reconfigurable housing is in the second shape.

5. The reconfigurable device according to claim 4, further including:
    a memory, coupled to the processor, for storing the first predetermined area associated with the first shape and the second predetermined area associated with the second shape.

6. The reconfigurable device according to claim 1, wherein the flexible display has a flat configuration, and the processor controls the active area to be the entire flexible display when the flexible display is in the flat configuration.

7. The reconfigurable device according to claim 6, wherein the display has at least a first curved configuration, and the processor controls the active area to be less than half of the entire flexible display when the flexible display is in the first curved configuration.

8. The reconfigurable device according to claim 1, further including:
    a display driver coupled to the processor, wherein the processor controls the display driver to change the delineation of the active area from the inactive area.

9. The reconfigurable device of claim 1, wherein the flexible display comprises a touch sensitive screen coupled to the processor, wherein the processor is programmed to:
    initiate a re-sizing program for changing the delineation of the active area from the inactive area; and
    change the delineation of the active area from the inactive area when the touch sensitive screen detects activation of at least two points on the touch sensitive screen, and
    use the at least two points to delineate dimensions of a desired active area.

10. The reconfigurable device of claim 9, wherein the processor is further programmed to resize fonts corresponding to the dimensions of the active area.

11. The reconfigurable device of claim 9, wherein the processor is further programmed to resize graphic elements corresponding to the dimensions of the active area.

12. The reconfigurable device of claim 9, wherein the processor initiates the re-sizing program when the flexible display alters away from a flat configuration.

13. The reconfigurable device of claim 1, wherein the flexible display further comprises:
    a switch that detects a mating of a first end of the flexible display with a second end of the flexible display.

14. The reconfigurable device of claim 1, wherein the flexible display is selectively a wrist-worn device or a hand-held device.

15. An electronic product comprising:
    a flexible touch sensitive display delineated into an active area that visually displays content and an inactive area with no visual display of content;
    a controller coupled to the flexible touch sensitive display, wherein the controller is programmed to:
        initiate a re-sizing program for changing the delineation of the active area from the inactive area; and
        change the delineation of the active area from the inactive area when the flexible touch sensitive display detects activation of at least two points on the flexible touch sensitive display; and
        use the at least two points to delineate dimensions of a desired active area,
    wherein the flexible touch sensitive display is fully exposed when the flexible touch sensitive display detects activation of the at least two points on the flexible touch sensitive display.

16. A method of re-sizing an active area of a flexible display comprising:
    delineating the flexible display into the active area that visually displays content and an inactive area with no visual display of content;
    initiating a re-sizing program upon detection of the flexible display altering from a first shape to a second shape, wherein the flexible display is fully exposed in both the first shape and the second shape;
    receiving signals indicative of the second shape of the flexible display; and
    changing the delineation of the active area from the inactive area dependent upon the second shape of the flexible display.

17. The method of claim 16, wherein the method further comprises:
    detecting activation of at least two points on the flexible display, and
    using the at least two points to delineate dimensions of a desired active area for the flexible display.

18. The method of claim 17, wherein the detecting activation comprises:
    touch sensing the at least two points on the flexible display.

19. The method of claim 16, wherein the method further comprises:
   re-sizing fonts corresponding to dimensions of the active area; and
   re-sizing graphic elements corresponding to the dimensions of the active area.

20. The method of claim 16, wherein the initiating the re-sizing program comprises:
   recognizing that a first end of the flexible display has mated with a second end of the flexible display.

* * * * *